United States Patent [19]

Nanami

[11] Patent Number: 5,213,526
[45] Date of Patent: May 25, 1993

[54] SUPPORT ASSEMBLY FOR MARINE PROPULSION UNIT

[75] Inventor: Masayoshi Nanami, Shizuoka, Japan

[73] Assignee: Sanshin Kogyo Kabushiki Kaisha, Japan

[21] Appl. No.: 936,221

[22] Filed: Aug. 27, 1992

[30] Foreign Application Priority Data

Aug. 27, 1991 [JP] Japan .................. 3-239002

[51] Int. Cl.$^5$ ............................. B63H 5/12
[52] U.S. Cl. .................... 440/53; 440/38; 440/58
[58] Field of Search .............. 440/53, 58–63, 440/83, 900, 38, 79

[56] References Cited
U.S. PATENT DOCUMENTS 1,816,414  7/1931  Whitlock .................. 440/53
5,151,057  9/1992  Kobayashi et al. ........... 440/38

Primary Examiner—Edwin L. Swinehart
Attorney, Agent, or Firm—Bacon & Thomas

[57] ABSTRACT

An assembly for rotatably supporting the propulsion unit of an inboard/outboard marine propulsion system of a watercraft is disclosed. The watercraft includes an engine mounted therein which is drivingly connected to the propulsion unit through a through-hole formed in the transom of the watercraft. The support assembly includes a first bearing arrangement for rotatably supporting the drive from the engine to the propulsion unit and a second, concentrically mounted bearing arrangement for rotatably supporting the propulsion unit relative to the transom. The concentric bearing arrangement permits the propulsion unit to be rotated between above-water and in-water positions while minimizing the length of the propulsion system, thereby conserving space and allowing the propulsion unit to be more compact.

22 Claims, 3 Drawing Sheets

SUPPORT ASSEMBLY FOR MARINE PROPULSION UNIT

BACKGROUND OF THE INVENTION

1. Field of the Invention

The present invention pertains to a support assembly for a marine propulsion unit and, more particularly, an assembly for rotatably supporting a propulsion unit of an inboard/outboard marine propulsion system relative to a transom of a watercraft.

2. Discussion of the Prior Art

Inboard/outboard marine propulsion systems for watercraft are widely known in the art. Such propulsion systems include an engine which is positioned inside the watercraft and a propulsion unit which is positioned outside the watercraft. Output drive from the engine is transmitted to the propulsion unit by linking an output shaft of the engine with an input shaft of the propulsion unit through the transom of the watercraft. It is also known in the art to rotatably mount a casing which houses the propulsion unit about the common axis defined by the output shaft of the engine and the input shaft of the propulsion unit so as to selectively shift the propulsion unit between above-water and in-water positions. Such prior art arrangements are represented by U.S. Pat. Nos. 3,111,108 and 3,136,286.

Such marine propulsion systems which permit the propulsion unit to be rotated relative to the watercraft provide various advantages. For instance, when docking or storing the watercraft, the propulsion unit can be positioned above the water level to prevent adhesion of barnacles and the like to the propulsion unit. In addition, when foreign matter becomes lodged in the propeller or impeller, this matter can be easily removed by positioning the propulsion unit in a convenient above-water position.

In the above-referenced marine propulsion systems of the prior art, the propulsion unit is supported by a bracket attached to the transom of the watercraft. The bracket has a first set of bearings which allows the rotation of the casing of the propulsion unit relative to the bracket and a second set of bearings on the casing which supports the input shaft of the propulsion unit. In these prior art arrangements, the first and second sets of bearings must be positioned at spaced intervals which requires a rather long casing for the propulsion unit. Based on this requirement, a considerable space in the fore-aft direction is required to accommodate the propulsion unit. Therefore, such prior art arrangements do not provide a marine propulsion system which is compact in the longitudinal direction.

SUMMARY OF THE INVENTION

It is an object of the present invention to provide an inboard/outboard marine propulsion system for use on a watercraft including an engine mounted within the watercraft which is drivingly connected through a through-hole in the transom of the watercraft to a propulsion unit which can be rotated relative to the watercraft between above-water and in-water positions.

It is another object of the present invention to provide a rotatably mounted propulsion unit which is compact in the fore-aft direction.

These and other objects of the present invention are accomplished by providing a support assembly for a rotatably mounted propulsion unit which includes a bearing support member, including inner and outer surface portions, secured to the transom of the watercraft concentrically about an output shaft of the engine. The output shaft of the engine is drivingly connected with an input shaft of the propulsion unit within the bearing support member. A first bearing assembly is concentrically mounted between one of the input and output shafts and the inner surface portion of the bearing support member to rotatably support the shaft. A propulsion unit casing houses the propulsion unit and includes first and second portions. The first portion of the casing is rotatably mounted about the outer surface portion of the bearing support member with a second bearing assembly therebetween such that the second portion of the propulsion unit can be shifted to various positions about the axis defined by the input and output shafts. By this arrangement, the bearing assemblies which rotatably support the shafts and the propulsion casing respectively are radially spaced from one another which enables the propulsion unit to be compact in the fore-aft direction.

Other objects, features and advantages of the present invention shall become more readily apparent from the following detailed description of preferred embodiments thereof, when taken in conjunction with the drawings wherein like reference refer to corresponding parts in the several views.

DETAILED DESCRIPTION OF THE PREFERRED EMBODIMENTS

Figure 1:
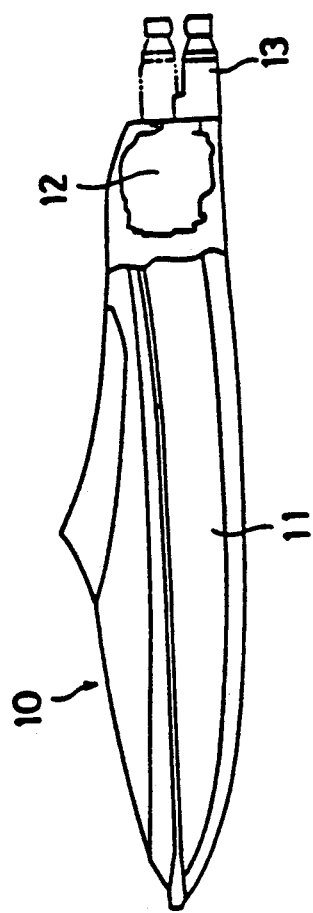
FIG. 1 is a perspective view of a watercraft incorporating the propulsion unit support assembly of the present invention.
Figure 2:
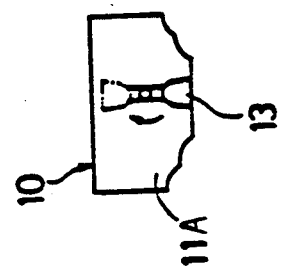
FIG. 2 is a rear view of the watercraft shown in FIG. 1.

With initial reference to FIGS. 1 and 2, an inboard/outboard marine propulsion system is depicted upon a watercraft generally indicated at 10. Watercraft 10 includes a hull 11 and a transom 11A. Mounted within watercraft 10 is an engine 12 which is drivingly connected to a propulsion unit 13 which, in turn, is rotatably mounted relative to watercraft 10 between various above-water and in-water positions.

Figure 3:
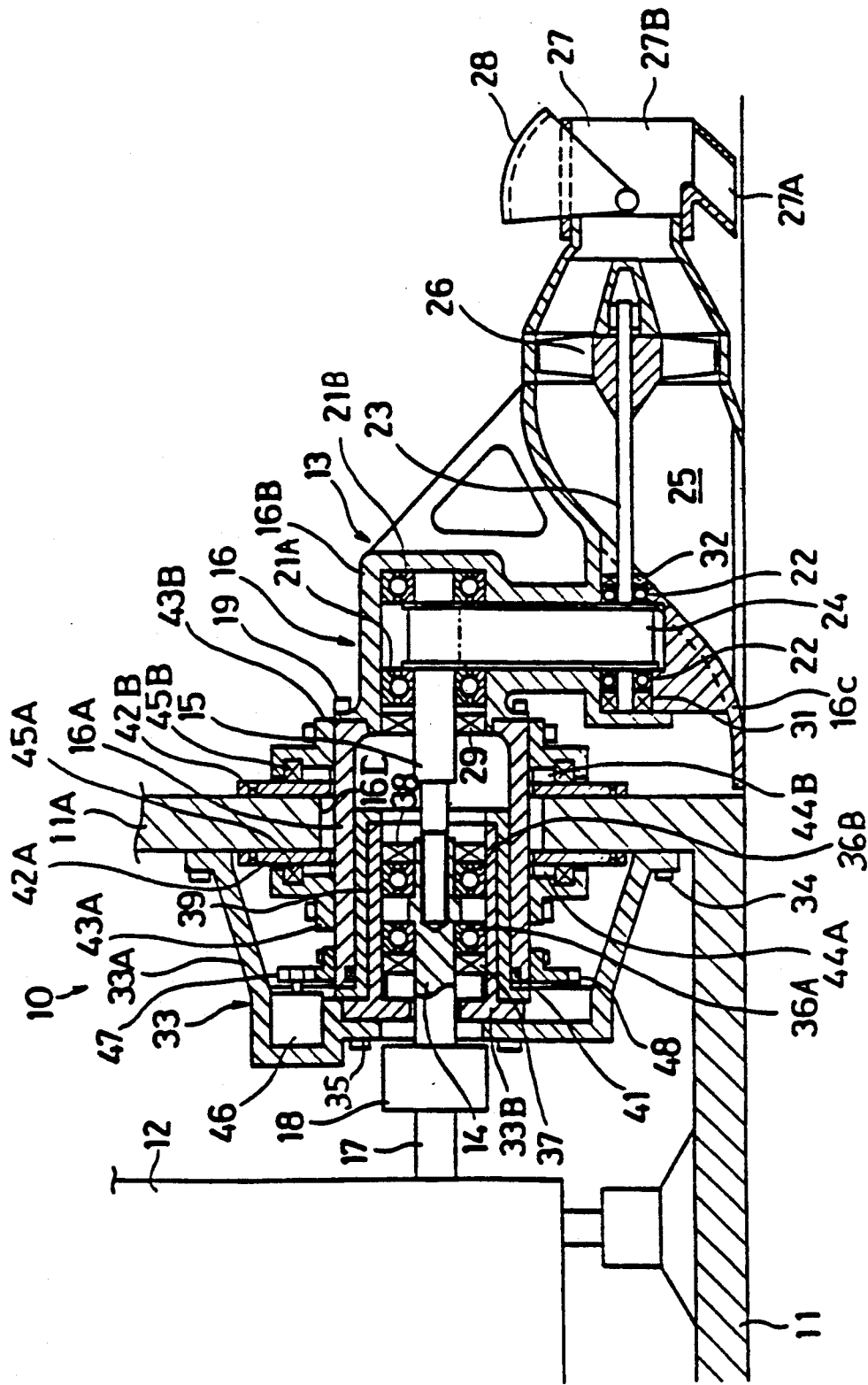
FIG. 3 is a cross-sectional view of a support assembly for the rotatably mounted propulsion unit of the present invention according to a first embodiment thereof.

Reference will now be made to FIG. 3 in describing a first embodiment of the present invention. As depicted, engine 12 includes an output shaft 14 which is spline connected to an input shaft 15 of propulsion unit 13. Propulsion unit 13 is housed within a casing 16 which will be described more fully below. Output shaft 14 is joined to a crankshaft 17 of engine 12 by means of a resilient coupling 18 in a manner known in the art. In this embodiment, output shaft 14 includes a female spline end portion which is interengaged with a male splined end portion of input shaft 15, through a through-hole 16D in transom 11A, such that drive power from output shaft 14 is delivered to input shaft 15.

Casing 16 for propulsion unit 13 is comprised of a first cylindrical casing 16A which is concentrically mounted about a common longitudinal axis defined by output shaft 14 and input shaft 15, a second casing 16B and a third casing 16C. Second casing 16B is removably secured to first casing 16A by means of a plurality of bolts 19. Input shaft 15 is rotatably supported within second casing 16B by means of bearings 21A and 21B. Third casing 16C rotatably supports, by means of bearings 22, an impeller shaft 23 which extends parallel to input shaft 15. Input shaft 15 is drivingly connected to impeller shaft 23 by means of a belt 24. Casing 16 is provided with an intake duct 25 through which impeller shaft 23 extends. Intake duct 25 leads to an impeller 26 which is affixed to the end of impeller shaft 23. A rudder-type steerable duct 27 is attached to the outlet side of intake duct 25. A jet flow control bucket 28 is pivotally attached to steering duct 27 to control the flow of water through intake duct 25 and out a forward jet outlet 27A and a reverse jet outlet 27B. Bearings 21A and 21B for input shaft 15 are sealed within second casing 16B by a seal 29. In a similar manner, seals 31 and 32 extend between impeller shaft 23 and casing 16 on either side of bearings 22A and 22B respectively.

As stated above, output shaft 14 and input shaft 15 extend through a through-hole 16D formed in transom 11A. A propulsion unit support bracket 33 is bolted to the inside of transom 11A by a plurality of bolts 34. Support bracket 33 is composed of a cap-shaped member 33A and a cylindrical bearing support member 33B. Cap-shaped member 33A is secured to cylindrical bearing support member 33B by means of a plurality of bolts 35. As shown, cylindrical bearing support member 33B is concentrically mounted about output shaft 14. A pair of first bearing assemblies 36A and 36B are positioned between an inside surface portion of cylindrical bearing support member 33B and output shaft 14 to rotatably support output shaft 14 of engine 12. Seals 37 and 38 are positioned fore and aft of bearings 36A and 36B respectively and extend between the inner surface portion of cylindrical bearing support member 33B and output shaft 14.

As previously stated, casing 16 of propulsion unit 15 is adapted to rotate relative to transom 11A of watercraft 10. For this purpose, an outside bearing member 39 is positioned about the outer surface of cylindrical bearing support member 33B. Concentrically mounted about outside bearing member 39 is first casing 16A of propulsion unit 15. Outside bearing member 39 is sealed against the inside surface of first casing 16A by means of a seal 41. By this construction, first casing 16A can rotate about outside bearing member 39.

Secured to the inside and outside surfaces of transom 11A, about through hole 16D, is an inside turning plate 42A and an outside turning plate 42B respectively. Fore and aft bearing housings 43A and 43B are fixedly secured to first casing 16A on either side of transom 11A. A reverse thrust bearing 44A is sandwiched between inside turning plate 42A and bearing housing 43A. In a similar manner, a forward thrust bearing 44B is sandwiched between outside turning plate 42B and bearing housing 43B. A seal 45A extends around reverse thrust bearing 44A and a seal 45B extends about forward thrust bearing 44B to seal thrust bearings 44A and 44B respectively.

Fixedly mounted within cap-shaped member 33A of support bracket 33 is a casing drive motor 46. Secured to an output shaft of casing drive motor 46 is a gear wheel 47. Gear wheel 47 is interengaged with a gear 48 secured by a plurality of bolts (not labeled) to first casing 16A. Activation of motor 46 functions to rotate casing 16 relative to transom 11A such that second casing portions 16B and 16C can be shifted between above-water and in-water positions.

The general operation of the above-described marine engine will now be described. Engine 12 transmits power to impeller shaft 23 via output shaft 14, input shaft 15 and belt 24. Rotation of impeller shaft 23 causes impeller 26 to turn which produces a jet stream ejected through rearward jet opening 27B and/or forward jet opening 27A at a rate controlled by the degree of opening allowed by bucket 28 over rear jet opening 27B in the steering duct 27. In this manner, watercraft 10 may be propelled forward, backward or maintained in a neutral driving condition. The rotational force of casing drive motor 46 is transmitted via gears 47 and 48 to first casing 16A of propulsion unit 13 causing casing 16 to rotate about the common axis of output shaft 14 and input shaft 15. This allows propulsion unit 13 to be shifted to positions in and out of the water.

Casing 16 is split outside transom 11A into first casing 16A and second casing 16B so that casing 16 can be taken apart and assembled as described below. If first casing 16A and output shaft 14 are pre-supported by inside bearings 36A, 36B and outside bearing 39 of support bracket 33, then the male spline of input shaft 15, supported by the second casing 16B, can be inserted into the female spline of output shaft 14 so that second casing 16B is assembled to first casing 16A and maintained in place by bolts 19.

In this embodiment, inside bearings 36A and 36B support the output shaft 14 of engine 12 and the outside bearing member 39 supports casing 16 of the propulsion unit 13 so as to be freely rotatable in a concentrically stacked position inside and outside the support bracket 33. With this concentric relationship, it is possible to reduce the overall fore-aft length of casing 16, thereby allowing propulsion unit 13 to be more compact.

Figure 4:
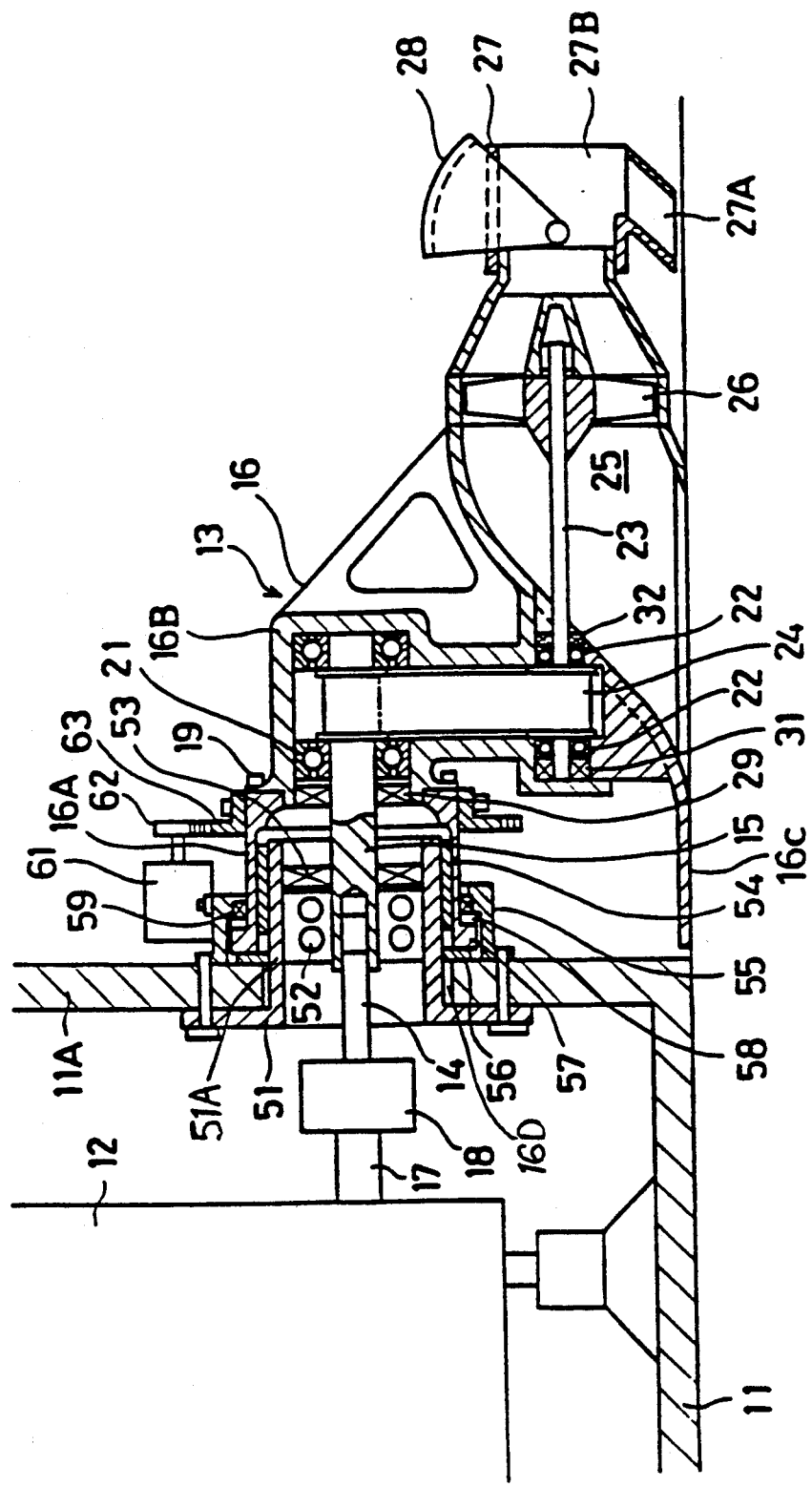
FIG. 4 is a cross-sectional view of a support assembly for a rotatably mounted propulsion unit according to a second embodiment of the invention.

Reference will now be made to FIG. 4 in describing a second embodiment of the invention. In this embodiment, like reference numerals to the first embodiment described above have been carried over and therefore reference is made to the description above regarding these elements. In this second embodiment, output shaft 14 is provided with a male splined end portion and input shaft 15 includes a female splined portion. Instead of utilizing support bracket 33 as in the first embodiment, the second embodiment utilizes a support bracket 51 which is secured to transom 11A by a plurality of bolts (not labeled). Support bracket 51 includes a cylindrical portion 51A which extends through through-hole 16D in transom 11A. An inside bearing 52 is mounted between input shaft 15 of propulsion unit 13 and the inner surface of cylindrical portion 51A of support bracket 51. A seal 19 is extends between input shaft 15 and the inner surface of cylindrical portion 51A aft of bearing 52. The first casing 16A of propulsion unit 13 is concentrically mounted about cylindrical portion 51A of support bracket 51 with an outside bearing member 54 located therebetween.

The bolts that secure support bracket 51 to transom 11A additionally function to secure a thrust bearing retainer 55 to transom 11A. Thrust bearing retainer 55 is mounted about the outside surface of through-hole 16D. Thrust bearing retainer 55 retains a forward thrust bearing 56 and a flange 57 of first casing 16A between it and the outside surface of transom 11A. A forward thrust bearing 58 is sealed by a seal 59 between flange 57 and thrust bearing retainer 55.

A casing drive motor 61 is fixedly secured to thrust bearing support member 55 outside of watercraft 10. The output shaft of motor 61 is used to drive a gear 62 which is engaged with a gear 63 fixedly secured about the perimeter of first casing 16A. The general operation of this second embodiment is similar to that of the first. In this second embodiment, since the inside bearing 52 and the outside bearing 54 are held by support plate 51 outside of watercraft 10, engine 12 can be positioned closer to transom 11A in order to provide additional space within watercraft 10. As in the first embodiment, the concentric mounting of the bearings provide for a compact arrangement for the propulsion system.

Although described with reference to various preferred embodiments of the invention, it is to be understood that various changes and/or modifications can be made to the present invention without departing from the spirit of the invention. In both embodiments, either the engine output shaft or the propulsion input shaft is supported by an inside bearing and an outside bearing supports the casing of the propulsion unit so that the propulsion unit is free to rotate between in water and out of water positions. The concentric mounting arrangement allows the casing length for the propulsion unit to be shortened in the fore-aft direction, thereby conserving space and allowing the propulsion unit to be more compact. In general, the invention is only intended to limited by the scope of the following claims.

I claim:

1. In an inboard/outboard marine propulsion system for use on a watercraft having a transom with a fore-aft extending through-hole formed therein, an engine mounted within the watercraft and including a power output shaft aligned with the through-hole in the transom; a propulsion unit having an input shaft drivingly connected to the engine output shaft; and a supporting assembly for supporting the propulsion unit for rotation relative to the watercraft about a longitudinal axis defined by the output shaft of the engine and input shaft of the propulsion unit; said propulsion unit including means for providing propulsive thrust to the watercraft, said propulsive thrust means being vertically offset from said longitudinal axis, the improvement wherein said supporting assembly comprises:

an annular bearing support member adapted to be secured to the transom so as to extend concentrically about at least one of the input and output shafts, said bearing support member including concentric inner and outer surface portions;

first bearing means concentrically mounted between at least one of said input and output shafts and the inner surface portion of said bearing support member for rotatably supporting said at least one shaft; said first bearing means housed within said inner surface portion;

said propulsion unit including a casing which supports the propulsive thrust means, said casing including a forward portion concentrically mounted relative to and extending along said outer surface portion concentric with said first bearing means, and being rotatably mounted relative to said outer surface portion such that the forward casing portion and propulsive thrust means can be rotated to various positions about said longitudinal axis.

2. The improvement as claimed in claim 1, said casing forward portion comprising an annular casing member having an inner surface portion, and including a second annular bearing means concentrically mounted on said outer surface portion of said bearing support member between said outer surface portion and said inner surface portion of said casing member for providing a rotary motion bearing between said casing member and said outer surface of said bearing support member.

3. The improvement as claimed in claim 2, wherein said outer surface portion of said bearing support member comprises a rotary sliding bearing surface, and said second bearing means includes an inner sliding bearing surface contiguous with and cooperating with said rotary sliding bearing surface, whereby said sliding bearing surfaces provide rotational freedom of movement and structural support between said second bearing means and said bearing support member.

4. The improvement as claimed in claims 1, 2 or 3 including thrust bearing means associated with the propulsion unit forward casing portion for reacting propulsion thrust forces between the propulsion unit forward casing portion and the transom of a watercraft.

5. The improvement as claimed in claims 1, 2 or 3 wherein said engine power output shaft and said propulsion unit input shaft are drivingly interconnected together by a shaft coupling, said coupling arranged to allow relative axial displacement between said shafts at least during assembly of the propulsion unit to the watercraft.

6. The improvement as claimed in claim 5, wherein said coupling is disposed within said first bearing means.

7. The improvement as claimed in claims 1,2 or 3, including a support bracket located between said propulsion unit forward casing portion and the position of the engine in the watercraft, said bearing support member being secured to and support by the support bracket, said support bracket including means for securing said bearing support member to the transom of a watercraft.

8. The improvement as claimed in claim 7, wherein said propulsion unit forward casing portion is adapted to extend through said through-hole to a position inboard of the transom to which said bearing support member is secured.

9. The improvement as claimed in claim 1,2 or 3, wherein said bearing support member is adapted to extend aft of a transom to which the bearing support member is secured, and said forward casing portion of said propulsion unit casing is disposed entirely aft of said transom in assembled position.

10. The improvement as claimed in claim 8, including means disposed inboard of the transom position of said watercraft for engaging and selectively rotating said propulsion unit forward casing portion relative to said bearing support member.

11. The improvement as claimed in claim 9, including means disposed outboard of the transom position of said watercraft for engaging and selectively rotating said propulsion unit forward casing portion relative to said bearing support member.

12. The improvement as claimed in claim 1,2, or 3, wherein said propulsion unit casing includes an aft casing portion also supporting said propulsion means, said forward and aft casing portions being separable from each other.

13. The improvement as claimed in claim 12, wherein said aft casing portion includes bearing means for supporting said input shaft for rotation.

14. A support system for a marine propulsion of an inboard/outboard propulsion system, comprising:

a watercraft including a hull, an inboard engine mounted in the hull, a transom including an opening for a drive shaft, an outboard propulsion unit outboard of the hull and transom, and including a propulsive thrust system, and drive shafting between the engine and propulsion system, part of the shafting extending through the transom opening, said propulsive thrust system being vertically offset from the drive shafting part extending through the transom;

an annular bearing support member rigidly secured to the transom and extending coaxially with the drive shafting part extending through the transom opening;

a propulsion unit casing supporting said propulsive thrust system and including an annular forward portion extending coaxially with said drive shafting part extending through the transom opening and coaxially with and externally of said bearing support member, said forward casing portion supported for relative rotary motion by said bearing support member;

shaft bearings within said bearing support member supporting said drive shafting part extending through the transom opening, said shaft bearings, bearing support member and casing forward portion lying concentric with each other and with said drive shafting part extending through the transom opening; and means for selectively driving the propulsion unit casing forward portion in rotation relative to said bearing support member for displacing the propulsive thrust unit vertically relative to the drive shafting part extending through the transom opening.

15. A support system as claimed in claim 14, including an outside bearing member supported by said bearing support member and disposed between said propulsion unit casing forward portion and said bearing support member, whereby said casing forward portion is mounted on said outside bearing member for rotary motion relative to said bearing support member.

16. A support system as claimed in claim 14 or 15, wherein said propulsion unit casing forward portion extends through said transom opening to a position inboard of the transom.

17. A support system as claimed in claim 14 or 15, including thrust bearing means associated with the propulsion unit casing forward portion for reacting thrust loading of said propulsive thrust system transmitted through the propulsion unit casing to the transom, said thrust bearing means arranged to accommodate relative rotation between said propulsion unit forward casing and the transom as well as thrust loads.

18. A support system as claimed in claim 16, including thrust bearing means associated with the propulsion unit casing forward portion for reacting thrust loading of said propulsion thrust system transmitted through the propulsion unit casing to the transom, said thrust bearing means arranged to accommodate relative rotation between said propulsion unit forward casing and the transom as well as thrust loads.

19. A support system as claimed in claim 14 or 15, wherein said drive shafting includes first and second portions, and including an axially splined connection adjacent said shaft bearings drivingly connecting said shaft portions.

20. A support system as claimed in claim 19, wherein said first shaft portion comprises an output shaft directly connected to the engine, and said second shaft portion comprises an input shaft connected to the propulsive thrust system, and bearing means for supporting said second shaft portion within said propulsion unit casing.

21. A support system as claimed in claim 19, said propulsion unit casing including an aft casing portion supporting said propulsive thrust system, said forward casing portion and aft casing portion being removably joined together.

22. A support system as claimed in claim 19, said propulsion unit casing including an aft casing portion supporting said propulsive thrust system, said forward casing portion and aft casing portion being removably joined together; and wherein said first shaft portion comprises an output shaft directly connected to the engine, and said second shaft portion comprises an input shaft connected to the propulsive thrust system; and bearing means disposed in said aft casing portion for supporting said second shaft portion within said aft casing portion of said propulsion unit casing.

* * * * *